United States Patent [19]

Schaaphok

[11] Patent Number: 5,722,301
[45] Date of Patent: Mar. 3, 1998

[54] PUSH-PULL BLADE CONTROL WITH DEFLECTABLE END ROD

[75] Inventor: Peter R. W. Schaaphok, Petersburgh, N.Y.

[73] Assignee: VPS Control Systems, Inc., Troy, N.Y.

[21] Appl. No.: 677,629

[22] Filed: Jul. 8, 1996

[51] Int. Cl.[6] .................................................. F16C 1/28
[52] U.S. Cl. .................................. 74/502.3; 74/502.4
[58] Field of Search .............................. 74/502.3, 502.4, 74/502.6

[56] References Cited

U.S. PATENT DOCUMENTS

| 3,452,615 | 7/1969 | Gregory, Jr. | 74/502.3 |
| 3,990,321 | 11/1976 | Hurlow | 74/502.3 |
| 4,321,840 | 3/1982 | Kalamon | 74/502.4 X |

Primary Examiner—Charles A. Marmor
Assistant Examiner—Mary Ann Battista
Attorney, Agent, or Firm—Paul W. Garbo

[57] ABSTRACT

An improved end fitting for push-pull blade controls is formed of two tubes connected together by a swivel joint. One tube of the compound fitting is attachable to an end of the tubular sheath of the control and anchors the ends of ball races of the control. The other tube of the compound fitting houses a reciprocative end rod connectable to an end of the push-pull blade that extends fully through the tube attached to the sheath and through the swivel joint. A simple but effective swivel joint is formed by an outwardly flared end of one tube movably captured in an inwardly flared end of the other tube. Thus, while the tube attached to the sheath of the control is installed in a fixed position, the other tube with the end-rod is deflectable.

12 Claims, 2 Drawing Sheets

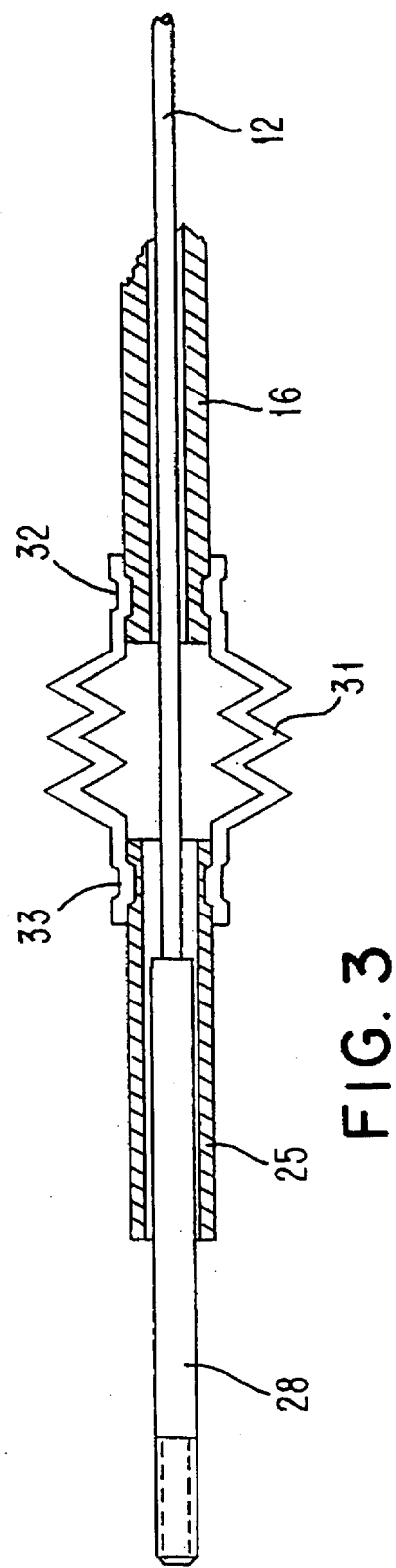
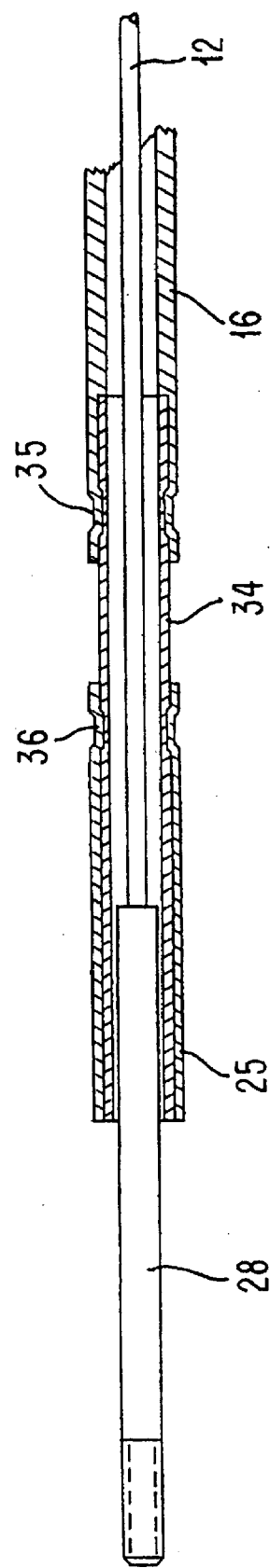

5,722,301

PUSH-PULL BLADE CONTROL WITH DEFLECTABLE END ROD

BACKGROUND OF THE INVENTION

This invention relates to an improved push-pull blade control wherein at least one of the two end rods is deflectable relative to its concomitant end fitting.

U.S. Pat. No. 3,287,990 to Ellinger is illustrative of push-pull blade controls wherein the push-pull blade extends through a tubular sheath and is connected to an end rod within an end fitting attached to each end of the sheath. The blade, which can be reciprocated within the sheath by applying a push or pull force to either end rod, has a series of spaced bearing balls on each of its opposite sides to facilitate movement.

A pair of ball races hold the spaced balls against grooves in the opposite sides of the push-pull blade. The ball races, like the blade, terminate within the end fittings at the opposite ends of the sheath. Ellinger and other patents, such as U.S. Pat. No. 3,509,782 and 4,516,441, disclose different means for anchoring the ends of the ball races within each end fitting. Hence, each end fitting in the form of a rigid straight tube houses both the anchored ball races and a portion of the end rod connected to the push-pull blade. In fact, the tubular end fitting acts as the cylinder in which the end rod can be reciprocated as a piston. One end fitting is fastened at the locus of applied or input movement of the push-pull blade and the other end fitting is fastened at the locus of delivered or output movement of the blade.

Inasmuch as each end fitting is fastened in a fixed position, the means for actuating movement of the push-pull blade must be aligned with the end rod of the input end fitting. However, there are uses of push-pull blade controls where the actuator has an arcuate (not rectilinear) motion, such as a pivoted crank lever.

Manufacturers of push-pull blade controls have offered two solutions for controls connected to non-rectilinear devices. One solution involves fastening the end fitting in a fixed swivel so that the entire end fitting can be deflected relative to the swivel. The other solution involves fastening the end fitting in a fixed position and adding a ball joint at the end of the end rod so that the rotary motion of a pivoted crank lever and linking clevis can be converted and transmitted as linear motion of the end rod in its concomitant immovable end fitting.

Both solutions suffer from several disadvantages. The added gadgetry is expensive, increases resistance to movement of the push-pull blade, requires more space for installation and operation, and is not as trouble-free as the push-pull blade control.

Accordingly, the principal object of this invention is to provide an improved push-pull blade control that eliminates the gadgetry heretofore required to make an end rod of the control connectable to a non-linear actuator.

Another important object is to provide a simple modification of the end fitting of a push-pull blade control so that its associated end rod can be deflected relative to the portion of the end fitting in which the ends of the ball races are anchored.

Other features and advantages of the invention will be apparent from the description which follows.

SUMMARY OF THE INVENTION

In accordance with this invention, the ending fitting of a push-pull blade control is made of two tubes linked together by a swivel joint, e.g., the outwardly flared end of one tube is movably captured in the inwardly flared end of the other tube. The ends of the ball races are anchored in one tube of the end fitting while the push-pull blade extends through the same tube, the swivel joint and into the other tube wherein it is connected to the end rod. Thus, while the tubular portion of the end fitting in which the ball races are anchored is fastened in a fixed position, the tubular portion in which the end rod can slide to and fro is deflectable relative to the fixed portion of the end fitting. In short, the swivelly joined tube portions of the end fitting greatly simplify connection of the end rod to any non-linear actuator. The compound flexible end fitting in a simple way eliminates the gadgetry used with the conventional rigid end fitting when its concomitant end rod must be connected to a pivoted lever or other arcuate activator. Moreover, the novel end fitting avoids the frictional resistance, the spatial requirements, the expense and maintenance attention associated with the prior gadgetry.

BRIEF DESCRIPTION OF THE DRAWINGS

For a fuller understanding of the invention, reference is now made to the accompanying drawings of which:

FIG. 3 is a sectional view of a bellows-type swivel joint linking the two tubes of the flexible end fitting; and FIG. 4 is a sectional view of a flexible tubing joint linking the two tubes of the flexible end fitting.

DESCRIPTION OF PREFERRED EMBODIMENTS

Figure 1:
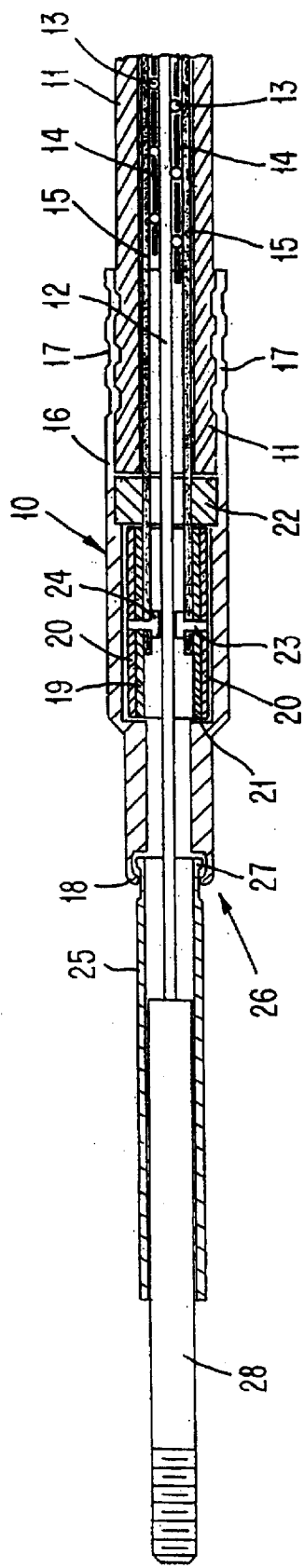
FIG. 1 is a longitudinal sectional view of the new flexible end fitting connected to the tubular sheath of a push-pull blade control.

FIG. 1 shows a simple compound flexible end fitting 10 attached to an end of the tubular sheath 11 of a push-pull blade control. Push-pull blade 12 is sandwiched between two series of bearing balls 13 that are spaced from one another by ball cage strips 14. Each series of spaced bearing balls 13 is held against a grooved face of blade 12 by an outer ball race 15. Tubular segment 16 of compound end fitting 10 is attached to sheath 11 by swaging end portion 17 of tube 16. The opposite end of tube 16 has an inwardly flared lip 18. The ends of ball races 15 are anchored, as taught by Ellinger, to a pair of concentric slotted cylinders 19,20 which are rotatable in tube 16 while held between shoulder 21 therein and anchor ring 22 positioned against the swaged end of sheath 11. A pin 23 passes through the end of each race 15 into slotted cylinders 19,20 and pin 23 has low-friction disc head 24 against a face of blade 12.

Tubular segment 25 of compound fitting 10 is deflectable relative to segment 16 at the swivel connection 26 formed by the outwardly flared lip 27 of tube 25 and inwardly flared lip 18 of tube 16. Blade 12 extends fully through tube 16 and swivel connection 26 into tube 25 wherein it is connected to end rod 28.

It will be readily appreciated that segment 25 of compound fitting 10 is easily deflectable relative to segment 16 which is held in a desired fixed position. Inasmuch as the push-pull blade is usually a steel blade, bending of the blade is easy along its grooved wide faces. Slight bending of the blade along its edges is also possible. Hence, in a commercially practical example of the invention, the push-pull blade can be bent up and down 8 degrees relative to its flat position to provide a total of 16 degrees of bending. Edgewise bending of the blade for a total of 6 degrees is also possible with the flexible compound fitting of the invention. Hence, the end rod connected to an end of the push-pull blade can be moved relative to the swivel joint of the compound fitting to trace an ellipsoid measuring 16 degrees at its major axis and 6 degrees at its minor axis. This considerable deflection of the end rod relative to the anchored ends of ball races in the flexible compound end fitting of the invention makes it an ideal replacement of a conventional rigid end fitting and the gadgetry added thereto to provide articulation of the end rod.

Apart from the principal novel feature of the end fitting of FIG. 1, which is its flexibility achieved by splitting it into two hinged sections, another important inventive feature is its simplicity of construction to house the slotted concentric cylinders in a rotatable state. Conventional rigid end fittings have generally been formed of two tubular portions screwed together. One portion would be attached to the sheath of the control and the other portion would contain the end rod. By screwing the two portions together, the slotted concentric cylinders would be captured adjacent the screwed juncture. The aforesaid patent of Ellinger clearly shows this widely used end fitting formed by two telescopically screwed tubular portions.

Figure 2:
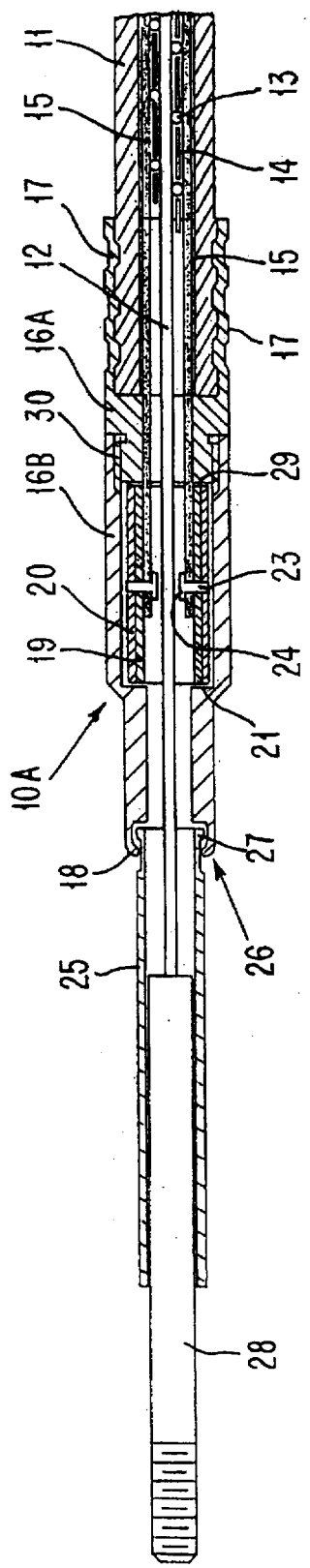
FIG. 2 is also a sectional view, like FIG. 1, of a conventional end fitting modified in accordance with this invention.

FIG. 2 shows the conversion of the Ellinger-type rigid end fitting into the flexible compound end fitting of this invention. Flexible compound end fitting 10A has tubular segment part 16A attached to sheath 11 by swaging end 17 while its opposite threaded end 30 is screwed into the threaded end of tubular segment part 16B. Anchor ring 22 in FIG. 1 is eliminated in FIG. 2 because threaded end 30 of segment part 16A has its end face 29 serve as anchor for concentric slotted cylinders 19,20.

Tubular segment part 16B has shoulder 21 so that concentric cylinders 19,20 are rotatably confined between shoulder 21 and end face 29 of segment part 16A. The anchoring of the ends of ball races 15 to slotted cylinders 19,20 is the same as described for the end fitting of FIG. 1.

Tubular segment 25 of compound fitting 10A is deflectable relative to tubular segment part 16B at the swivel connection 26 formed by the outwardly flared lip 27 of tube 25 and inwardly flared lip 18 of tube 16B. Blade 12 extends fully through screwed tubes 16A,16B and swivel connection 26 into tube 25 wherein it is connected to end rod 28.

The anchoring of the ball races as shown in FIGS. 1 and 2 follows the teachings of the Ellinger patent of 1966. In the ensuing 30 years several other anchoring means, such as disclosed in U.S. Pat. No. 4,516,441 to Paynter, have been developed. Inasmuch as the anchoring means for the ball races is not a part of this invention and is a matter of individual choice, the flexible compound end fitting of the invention may be provided with any chosen anchoring means. Of course, the selected means will be positioned in the segment of the end fitting which is attached to the tubular sheath of the remote control. Thus, the other segment of the end fitting which is deflectable houses only the reciprocative end rod connected to the push-pull blade.

As an alternative swivel joint to that shown in FIGS. 1 and 2 in the form of outwardly flared lip 27 captured by inwardly flared lip 18, FIG. 3 illustrates a flexible metal bellows 31 that serves as a swivel joint. Opposite ends 32,33 of bellows 31 are fastened on tube 16 of FIG. 1 and on tube 25, respectively, by swaging. Of course, bellows 31 can be connected to tubes 16,35 in other ways such as by welding or with threaded joints. Obviously, bellows 31 provides a swivel joint that permits deflection of end rod 28 far more than is practical with swivel joint 26 of FIGS. 1 and 2. Bellows 31 may be made of rubber or other materials, and may replace swivel joint 26 of FIG. 2.

Still another form of swivel joint is provided in FIG. 4 by flexible tubing 34 that is attached to tubes 16,25 of FIG. 1 by swaging ends 35,36, respectively. An adhesive between tubing 34 and tubes 16,35 ensures a strong connection. Flexible tubing 34 may be large enough to fit over tubes 16,25 and in such case pressure clamps around tubing 34 can anchor it to tubes 16,25. Also, an adhesive may be used to bond tubing 34 on tubes 16,25.

Those skilled in the art will visualize variations and modifications of the invention as exemplified in FIGS. 1 to 4 without departing from the spirit or scope of the invention. For example, the tubular segment attached to the tubular sheath of the remote control can have its end at the swivel joint flared outwardly and captured within an inwardly flared end of the tubular segment that contains the end rod. Accordingly, only such limitations should be imposed on the scope of the invention as are set forth in the appended claims.

What is claimed is:

1. In a remote control which has a push-pull blade movably supported in a tubular sheath by two series of spaced bearing balls between opposite faces of said blade and two outer ball races, each end of said sheath being attached to an end fitting with a rigid tubular body in which ends of said ball races are anchored and an end of said blade is connected to a reciprocative end rod, the improvement of at least one of said end fittings which comprises a first tubular segment and a second tubular segment connected together by a swivel joint which allows the second tubular segment to be flexed relative to the first tubular segment, in which said ends of said ball races are anchored in said first tubular segment and through which said end of said blade extends into said second tubular segment wherein it is connected to said end rod.

2. The remote control of claim 1 wherein the swivel joint is in the form of flexible tubing.

3. The remote control of claim 1 wherein the swivel joint is in the form of an inwardly flared end of the first tubular segment enclosing an outwardly flared end of the second tubular segment.

4. The remote control of claim 1 wherein the swivel joint is in the form of a bellows.

5. The remote control of claim 1 wherein the first tubular segment is in the form of two telescopically screwed tubes, a first of said tubes being attached to the tubular sheath and serving to anchor the ends of the ball races, and a second of said tubes being connected to the swivel joint.

6. The remote control of claim 5 wherein the swivel joint is in the form of an inwardly flared end of the second tube enclosing an outwardly flared end of the second tubular segment.

7. In an end fitting of a push-pull blade control which has a tubular body, one end of said body being attachable to an end of a tubular sheath of said control and serving to anchor ends of ball races of said control, and the other end of said body having a reciprocative end rod connectable to an end of a push-pull blade extending into said body, the improvement which comprises a first tubular segment and a second tubular segment with a swivel connection between said first and second segments thus which allows the second segment to be flexed relative to the first segment, said first segment being attachable to said end of said sheath and serving to anchor said ends of said ball races, and said second segment having said end rod connectable to said end of said push-pull blade extending through said first segment and said swivel connection into said second segment.

8. The end fitting of claim 7 wherein the first tubular segment is in the form of two telescopically screwed tubes, a first of said tubes being attachable to the tubular sheath and serving to anchor the ends of the ball races, and a second of said tubes being attached to the swivel connection.

9. The end fitting of claim 7 wherein the swivel connection is formed by an inwardly flared end of the first tubular segment around an outwardly flared end of the second tubular segment.

10. The end fitting of claim 7 wherein the swivel connection is in the form of a bellows.

11. The end fitting of claim 7 wherein the swivel connection is in the form of flexible tubing.

12. The end fitting of claim 7 wherein the swivel connection is in the form of an outwardly flared end of one of said tubular segments captured within an inwardly flared end of the other of said tubular segments.

* * * * *